_US005352289A_

United States Patent [19]

Weaver et al.

[11] Patent Number: 5,352,289
[45] Date of Patent: Oct. 4, 1994

[54] LOW ASH CARBON BLACKS

[75] Inventors: Daniel W. Weaver, Upton, United Kingdom; Frank J. Hrach, Jr., Parkersberg, W. Va.; Chung-Huei Shieh, Lexington; William L. Sifleet, Acton, both of Mass.; Jay J. Zimmer, Pampa, Tex.

[73] Assignee: Cabot Corporation, Boston, Mass.

[21] Appl. No.: 995,408

[22] Filed: Dec. 18, 1992

[51] Int. Cl.$^5$ ............................................. C09C 1/48
[52] U.S. Cl. .................. 106/476; 423/449.1; 524/496
[58] Field of Search ............... 423/458, 449.1, 449.2; 524/496; 106/476

[56] References Cited

U.S. PATENT DOCUMENTS

Re. 28,974  9/1976  Morgan et al. .................. 423/457
4,518,434  5/1985  Wilder ............................ 423/449.1

FOREIGN PATENT DOCUMENTS 60-152569  8/1985  Japan ............................ 423/450
02-2116608  5/1990  Japan ........................... 423/449.2

Primary Examiner—Gary P. Straub
Assistant Examiner—Stuart L. Hendrickson
Attorney, Agent, or Firm—Lawrence A. Chaletsky

[57] ABSTRACT

Novel furnace carbon blacks that impart advantageous properties to rubber and plastic compositions and may be utilized in the place of acetylene blacks. The furnace carbon blacks have an ash level less than or equal to 50 ppm, preferably less than or equal to 30 ppm, most preferably less than or equal to 10 ppm, a sulfur level less than or equal to 50 ppm, preferably less than or equal to 30 ppm most preferably less than or equal to 10 ppm, a $L_a$ less than or equal to 30 Å and a $L_c$ less than or equal to 30 Å. Also disclosed are novel rubber and plastic compositions incorporating the novel furnace carbon blacks which exhibit advantageous properties, particularly in extending the useful service life of power cables produced using the compositions.

19 Claims, 1 Drawing Sheet

FIGURE 1

LOW ASH CARBON BLACKS

FIELD OF THE INVENTION

The present invention relates to new oil furnace carbon blacks having low sulfur and ash levels, which are particularly well suited for use in plastic and rubber compositions intended for cable shielding applications.

BACKGROUND

Oil furnace carbon blacks are generally produced in a furnace-type reactor by pyrolyzing an hydrocarbon feedstock with hot combustion gases to produce combustion products containing particulate carbon black. A variety of methods for producing carbon blacks by the oil furnace process are generally known and are described in U.S. patents, such as U.S. Pat. Nos. 3,922,335; 3,401,020; and 2,785,964. An oil furnace process for producing carbon blacks is also described in the commonly assigned U.S. patent application Ser. No. 07/846,644, filed Mar. 5, 1992, the disclosure of which is hereby incorporated by reference.

In one type of a furnace carbon black reactor, such as shown in U.S. Pat. No. 3,401,020 to Kester et al., or U.S. Pat. No. 2,785,964 to Pollock, hereinafter "Kester" and "Pollock" respectively, a fuel, preferably hydrocarbonaceous, and an oxidant, preferably air, are injected into a first zone and react to form hot combustion gases. A hydrocarbon feedstock in either gaseous, vapor or liquid form is also injected into the first zone whereupon pyrolysis of the hydrocarbon feedstock commences. In this instance, pyrolysis refers to the thermal decomposition of a hydrocarbon. The resulting combustion gas mixture, in which pyrolysis is occurring, then passes into a reaction zone where completion of the carbon black forming reaction occurs.

In another type of a furnace carbon black reactor a liquid or gaseous fuel is reacted with an oxidant, preferably air, in the first zone to form hot combustion gases. These hot combustion gases pass from the first zone, downstream through the reactor, into a reaction zone and beyond. To produce carbon blacks, a hydrocarbonaceous feedstock is injected at one or more points into the path of the hot combustion gas stream. The hydrocarbonaceous feedstock may be liquid, gas or vapor, and may be the same or different than the fuel utilized to form the combustion gas stream. Generally the hydrocarbonaceous feedstock is a hydrocarbon oil or natural gas, however other hydrocarboneous feedstocks such as acetylene are known in the art. The first (or combustion) zone and the reaction zone may be divided by a choke or zone of restricted diameter which is smaller in cross section than the combustion zone or the reaction zone. The feedstock may be injected into the path of the hot combustion gases upstream of, downstream of, and/or in the restricted diameter zone. Furnace carbon black reactors of this type are generally described in U.S. Reissue Pat. No. 28,974 and U.S. Pat. No. 3,922,335.

In both types of processes and reactors described above, and in other generally known reactors and processes, the hot combustion gases are at a temperature sufficient to effect pyrolysis of the hydrocarbonaceous feedstock injected into the combustion gas stream. In one type of reactor, such as disclosed in Kester, feedstock is injected, at one or more points, into the same zone where combustion gases are being formed. In other type reactors or processes the injection of the feedstock occurs, at one or more points, after the combustion gas stream has been formed. In either type of reactor, since the hot combustion gas stream is continually flowing downstream through the reactor, pyrolysis continually occurs as the mixture of feedstock and combustion gases passes through the reaction zone. The mixture of feedstock and combustion gases in which pyrolysis is occurring is hereinafter referred to, throughout the application, as "the effluent". The residence time of the effluent in the reaction zone of the reactor is sufficient, and under conditions suitable, to allow the formation of carbon blacks. "Residence time" refers to the amount of time which has elapsed since the initial contact between the hot combustion gases and the feedstock. After carbon blacks having the desired properties are formed, the temperature of the effluent is lowered to stop pyrolysis. This lowering of the temperature of the effluent to stop pyrolysis may be accomplished by any known manner, such as by injecting a quenching fluid, through a quench, into the effluent. As generally known to those of ordinary skill in the art, pyrolysis is stopped when the desired carbon black products have been produced in the reactor. One way of determining when pyrolysis should be stopped is by sampling the effluent and measuring its toluene extract level. Toluene extract level is measured by ASTM D1618-83 "Carbon Black Extractables—Toluene Discoloration". The quench is generally located at the point where the toluene extract level of the effluent reaches an acceptable level for the desired carbon black product being produced in the reactor. After pyrolysis is stopped, the effluent generally passes through a bag filter system to separate and collect the carbon blacks.

Carbon blacks may be utilized as pigments, fillers, reinforcing agents, and for a variety of other applications. They are widely utilized as fillers and reinforcing pigments in the compounding and preparation of rubber compositions and plastic compositions. Carbon blacks are generally characterized on the basis of properties including, but not limited to, surface areas, surface chemistry, aggregate sizes, particle sizes and crystallite dimensions. The properties of carbon blacks are analytically determined by tests known to the art, including cetyl-trimethylammonium bromide adsorption (CTAB) and dibutyl phthalate adsorption (DBP).

In addition to a variety of other uses, such as tire, hoses, belts, and plastics, carbon blacks are generally utilized in compositions intended for use as semi-conductive shielding compounds for electric power cables. Electric power cables generally consist of electrically conductive wires surrounded by a dielectric insulating material which prevents escape of electricity to the environment. Semi-conductive shields are used to promote longer life in underground power cables. Two semiconductive layers are typically used: 1) the "conductor shield" which surrounds the conductor wires and is in intimate contact with the inside surface of the insulation layer, and 2) the "insulation shield" which surrounds the outer surface of the insulation layer. These shields act to increase cable life by reducing voltage stresses across the insulation layer by providing a smooth interface at both the inner and outer surface of the insulation. Requirements for both shielding layers include a specified degree of conductivity, appropriate mechanical properties, including tensile strength and elongation to break, smooth surface, as well as a high degree of chemical purity. The semi-conductive shields are composed of a mixture of a polymer and some type of conductive filler. Carbon black has been found to be conductive filler material that best meets all the requirements for this application.

A common cause of underground power cable failure is formation of "water trees" in the insulation layer of the cable. One possible cause of water trees is believed to be due to the presence of water and water soluble ions, such as sulfur and metallic cations, within the cable. Under the normal voltage gradients which exist in the cable, these ionic materials tend to migrate though the insulation layer. When a continuous pathway of water soluble, conductive ions is formed through the insulation layer, the cable fails. Analysis of cables has shown that the concentration of ionic impurities such as sulfur, calcium and the like are higher in water trees and in the insulation near the conductor shield than in the surrounding insulation material. One possible source of these ionic impurities is the carbon black filler in the conductor shield compound.

Carbon blacks with low sulfur and cation impurity levels are advantageous for use in long-life underground power cable shield compounds. The unique class of carbon blacks produced from pure acetylene, referred to as "acetylene blacks" are considered to be the industry standard for having the lowest sulfur and cation impurity levels. The calcium carbonate process and the acetylene gas process are generally used to manufacture acetylene black.

However, the commercial availability of acetylene blacks is limited and acetylene blacks are only commonly available within a narrow range of analytical and performance properties. Furthermore, the cost of acetylene blacks is generally higher than the costs of carbon blacks produced by the oil furnace process.

Thus, the majority of commercially available carbon blacks are produced using the oil furnace process due to its efficient use of raw materials and flexibility for producing carbon blacks with a wide range of analytical and performance properties.

From the foregoing discussion, it is apparent that it would be advantageous to produce carbon blacks that have ash and sulfur levels similar to, equivalent to, or lower than, acetylene blacks, using the oil furnace process. The furnace carbon blacks of the present invention achieve this advantage and other advantages that will become apparent from the following discussion and examples.

SUMMARY OF THE INVENTION

We have discovered a new class of furnace carbon blacks that contain 50 parts per million (ppm) ash or less, 50 ppm sulfur or less, and have crystallite dimensions ($L_a$) and ($L_c$) of 30 angstroms (Å) or less. Preferably the carbon blacks of the present invention contain 30 ppm, or less, ash and 30 ppm, or less, sulfur, and have a $L_a$ of 30 Å or less and a $L_c$ of 30 angstroms (Å) or less. Most preferably the carbon blacks of the present invention contain 10 ppm, or less, ash and 10 ppm, or less, sulfur, and have a $L_a$ of 30 Å or less and a $L_c$ of 30 angstroms (Å) or less. As used herein, "furnace carbon black" refers to a carbon black produced in a furnace process wherein a hydrocarbon feedstock is pyrolyzed with hot combustion gases to produce combustion products containing particulate carbon black. The new class of carbon blacks may have any combination of morphological/analytical properties achievable by the oil furnace process.

For wire and cable applications, the carbon blacks of the present invention are characterized by having the following combination of properties:
ash $\leq$ 50 ppm;
sulfur $\leq$ 50 ppm;
$L_a \leq$ 30 Å;
$L_c \leq$ 30 Å;
30 m$^2$/g $\leq$ CTAB $\leq$ 135 m$^2$/g; and
105 cc/100 g $\leq$ DBP $\leq$ 170 cc/100 g.

Preferably, for wire and cable applications, the carbon blacks of the present invention are characterized by having the following combination of properties:
ash $\leq$ 30 ppm;
sulfur $\leq$ 30 ppm;
$L_a \leq$ 30 Å;
$L_c \leq$ 30 Å;
30 m$^2$/g $\leq$ CTAB $\leq$ 135 m$^2$/g; and
105 cc/100 g $\leq$ DBP $\leq$ 170 cc/100 g.

Most preferably, for wire and cable applications, the carbon blacks of the present invention are characterized by having the following combination of properties:
ash $\leq$ 10 ppm;
sulfur $\leq$ 10 ppm;
$L_a \leq$ 30 Å;
$L_c \leq$ 30 Å;
30 m$^2$/g $\leq$ CTAB $\leq$ 135 m$^2$/g; and
105 cc/100 g $\leq$ DBP $\leq$ 170 cc/100 g.

Additional preferred carbon blacks of the present invention, for wire and cable applications, have the following properties:
ash $\leq$ 50 ppm, preferably $\leq$ 30 ppm, most preferably $\leq$ 10 ppm;
sulfur $\leq$ 50 ppm, preferably $\leq$ 30 ppm, most preferably $\leq$ 10 ppm;
$L_a \leq$ 30 Å;
$L_c \leq$ 30 Å;
120 m$^2$/g $\leq$ CTAB $\leq$ 135 m$^2$/g; and
105 cc/100 g $\leq$ DBP $\leq$ 130 cc/100 g.

Other additional preferred carbon blacks of the present invention have the following combination of properties:
ash $\leq$ 50 ppm, preferably $\leq$ 30 ppm, most preferably $\leq$ 10 ppm;
sulfur $\leq$ 50 ppm, preferably $\leq$ 30 ppm, most preferably $\leq$ 10 ppm;
$L_a \leq$ 30 Å;
$L_c \leq$ 30 Å;
30 m$^2$/g $\leq$ CTAB $\leq$ 45 m$^2$/g; and
105 cc/100 g $\leq$ DBP $\leq$ 130 cc/100 g.

We have also discovered new classes of rubber and plastic compositions containing the carbon blacks, which are particularly useful for wire and cable, conductive and other applications.

The carbon blacks of the present invention may be produced in a furnace carbon black reactor having a combustion zone, a transition zone, and a reaction zone. A carbon black yielding feedstock is injected into a hot combustion gas stream. The resultant mixture of hot combustion gases and feedstock passes into the reaction zone. Pyrolysis of the carbon black yielding feedstock is stopped by quenching the mixture after the carbon blacks of the present invention have been formed. Preferably pyrolysis is stopped by injecting a quenching fluid. The process for preparing the novel carbon blacks of the present invention will be described in greater detail hereinafter.

The rubbers and plastics for which the novel carbon blacks of this invention are effective include natural and synthetic rubbers and plastics. Generally, amounts of the carbon black product ranging from about 5 to about 300 parts by weight can be used for each 100 parts by weight of rubber or plastic (5–300 phr carbon black). Preferably amounts of the carbon black product ranging from about 40 to about 90 parts by weight can be used for each 100 parts by weight of rubber or plastic (40–90 phr carbon black).

Among the rubbers or plastics suitable for use with the present invention are natural rubber, synthetic rubber and their derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene. Additionally preferred polymeric compositions are olefins such as polypropylene and polyethylene.

An advantage of the carbon blacks of the present invention is that the carbon blacks are particularly well suited for use in power cable shielding compounds. The low sulfur and ash levels of the carbon blacks of the present invention will help promote longer cable life by minimizing the initiation of water trees in the insulation layer of the cable.

A further advantage of the present invention is that the carbon blacks are more economical to produce than acetylene blacks, which require the use of acetylene as a feedstock.

Other advantages of the present invention will become apparent from the following more detailed description of the invention.

DETAILED DESCRIPTION OF THE INVENTION

The present invention is directed to new furnace carbon blacks having the following properties:
 ash$\leq$50 ppm, preferably$\leq$30 ppm, most preferably$\leq$10 ppm;
 sulfur$\leq$50 ppm, preferably$\leq$30 ppm, most preferably$\leq$10 ppm;
 $L_a \leq 30$ Å; and
 $L_c \leq 30$ Å.

For wire and cable applications, the carbon blacks have the following properties:
 ash$\leq$50 ppm, preferably$\leq$30 ppm, most preferably$\leq$10 ppm;
 sulfur$\leq$50 ppm, preferably$\leq$30 ppm, most preferably$\leq$10 ppm;
 $L_a \leq 30$ Å;
 $L_c \leq 30$ Å;
 30 m$^2$/g$\leq$CTAB$\leq$135 m$^2$/g; and
 105 cc/100 g$\leq$DBP$\leq$170 cc/100 g.

Additional preferred carbon blacks of the present invention, for wire and cable applications, have the following properties:
 ash$\leq$50 ppm, preferably$\leq$30 ppm, most preferably$\leq$10 ppm;
 sulfur$\leq$50 ppm, preferably$\leq$30 ppm, most preferably$\leq$10 ppm;
 $L_a \leq 30$ Å;
 $L_c \leq 30$ Å;
 120 m$^2$/g$\leq$CTAB$\leq$135 m$^2$/g; and
 105 cc/100 g$\leq$DBP$\leq$130 cc/100 g.

Other additional preferred carbon blacks of the present invention have the following combination of properties:
 ash$\leq$50 ppm, preferably$\leq$30 ppm, most preferably$\leq$10 ppm;
 sulfur$\leq$50 ppm, preferably$\leq$30 ppm, most preferably$\leq$10 ppm;
 $L_a \leq 30$ Å;
 $L_c \leq 30$ Å;
 30 m$^2$/g$\leq$CTAB$\leq$45 m$^2$/g; and
 105 cc/100 g$\leq$DBP$\leq$130 cc/100 g.

Figure 1:
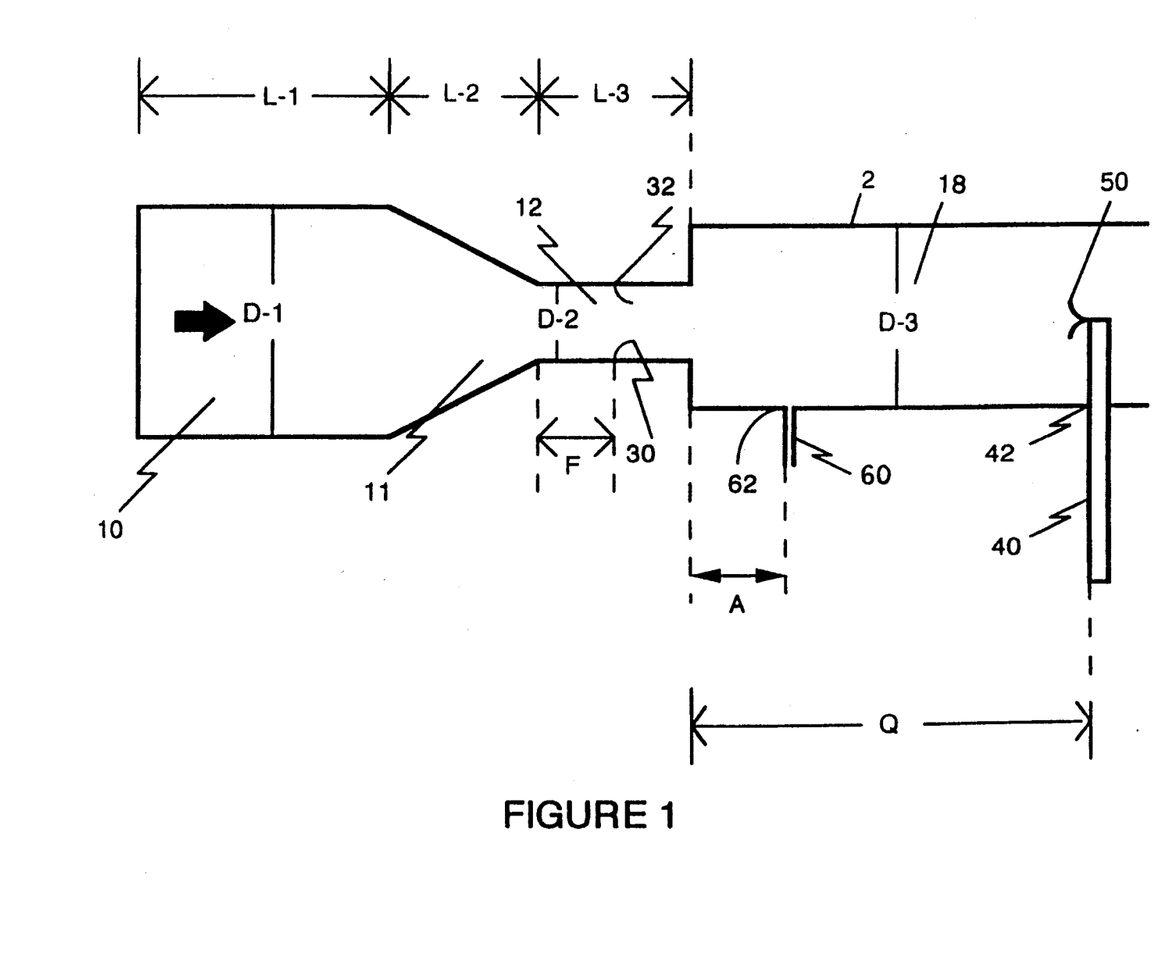
FIG. 1 is a cross-sectional view of a portion of one type of furnace carbon black reactor which may be utilized to produce the carbon blacks of the present invention.

The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found, for example, in the description contained in U.S. Pat. No. 3,922,335, the disclosure of which is herein incorporated by reference; and the description contained in U.S. patent application Ser. No. 07/846,6d4, filed Mar. 5, 1992, the disclosure of which is hereby incorporated by reference.

Preferably, the carbon black furnace is constructed using materials and procedures that minimize the introduction of extraneous ash into the carbon black formation process.

U.S. patent application Ser. No. 081846,644, now abandoned, relates to a process for producing carbon blacks wherein an oxidant-containing stream such as air, oxygen-enriched air, or combustion products of hydrocarbon fuel and air, is injected into the reactor in the secondary reaction zone at a point after the primary-reaction zone in order to accelerate the rate of surface modifying reactions in the secondary reaction zone by raising the temperature in the secondary reaction zone without interfering with reactions which normally occur in the primary reaction zone.

The process is suitable for use in any carbon black reactor wherein the temperature of the effluent stream prior to the downstream oxidant-containing stream injection is greater than 1800° F. and less than 2700° F. The location of the downstream oxidant-containing stream injection is at any point downstream of the primary reaction zone and upstream of the quench which terminates reactions in the effluent. The amount of oxidant stream addition is sufficient to raise the reactor effluent temperature by a minimum amount, $\Delta T_{min}$, depending on residence time, t, after oxidant addition and before quenching, defined by:

$\Delta T_{min} = 1598°$ F. $- 6.20$ x(t,ms); where $\Delta T_{min} \geq 110°$ F. and t $\geq$ 180 ms.

A furnace carbon black reactor that may be utilized to produce the carbon blacks of the present invention is depicted in FIG. 1. FIG. 1 illustrates a furnace carbon black reactor 2, having a combustion zone 10, which has a zone of converging diameter 11; feedstock injection zone 12; and reaction zone 18. The diameter of the combustion zone, 10, up to the point where the zone of converging diameter, 11, begins is shown as D-1; the diameter of zone 12, as D-2; and the diameter of zone 18 as D-3. The length of the combustion zone, 10, up to the point where the zone of converging diameter, 11, begins is shown as L-1; the length of the zone of converging diameter is shown as L-2; and the length of the feedstock injection zone is shown as L-3.

To produce carbon blacks hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone, 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to fuel varies with the type of fuel utilized. When natural gas is utilized to produce the carbon blacks of the present invention, the ratio of air to fuel may be from about 10:1 to about 100:1. To facilitate the generation of hot combustion gases, the oxidant stream may be preheated.

The hot combustion gas stream flows downstream from zones 10 and 11 into zones 12 and then 18. The direction of the flow of hot combustion gases is shown by the arrow in FIG. 1. Carbon black-yielding feedstock, 30, is introduced at point 32. The distance from the end of the zone of converging diameter, 11, downstream to point 32 is shown as F. In the examples described herein carbon black-yielding feedstock, 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to carbon black particles and aggregates.

Suitable for use herein as carbon black-yielding hydrocarbon feedstocks, which are readily volatilizable under the conditions of the reaction, include, but are not limited to, the following: olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

The mixture of carbon black-yielding feedstock and hot combustion gases (the "effluent") flows downstream through zone 12 into zone 18. In one example described herein, secondary air 62 was injected at point 60 into zone 18. The distance from the beginning of zone 18, to point 60, is shown as "A" in FIG. 1.

Quench 40, located at point 42, injecting quenching fluid 50, is utilized to stop pyrolysis of the carbon black-yielding feedstock when the novel carbon blacks of the present invention are formed. Point 42 may be determined in any manner known to the art for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables—Toluene Discoloration". Q is the distance from the beginning of zone 18 to quench point 42, and will vary according to the position of the quench.

Suitable quenching fluids for use in producing the novel carbon blacks of the present invention include quenching fluids known in the art, including, but not limited to, water.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer. Suitable, pelletizing fluids for use in producing pelleted carbon blacks of the present invention include, but are not limited to, water.

Any of the generally known and utilized carbon black-yielding hydrocarbon feedstocks. quenching fluids and pelletizing fluids may be utilized to produce the carbon blacks of the present invention provided that the ash level of the carbon blacks produced does not exceed 50 ppm; and provided that the sulfur level of the carbon blacks produced does not exceed 50 ppm.

The levels of ash and sulfur which may be present in the feedstock, quenching fluid and pelletizing fluid utilized in producing the carbon blacks of the present invention, may be determined by a material balance around the carbon black production process. The input streams in the carbon black production process are the combustion air, the primary fuel, the feedstock, the quenching fluid and, if the carbon blacks are wet pelletized, the pelletizing fluid. If the primary fuel is natural gas that contains no sulfur or ash, then only the feedstock, quenching fluid and pelletizing fluid need to be considered. The outputs of the carbon black production process are carbon black and effluent gases.

The theoretical ash and sulfur levels of a carbon black can be calculated from a material balance as follows:

Ash, ppm =

$$\frac{[(\text{Feedstock rate, pounds/hour}) \times (\text{Feedstock ash, ppm}) + (\text{Quenchrate, pounds/hour}) \times (\text{Quench ash, ppm}) + (\text{Pelletizing fluid rate, pounds/hour}) \times (\text{Pelletizing fluid ash, ppm})]}{(\text{Carbon black rate, pounds/hour})}$$

Sulfur, ppm =

-continued $$\frac{[(\text{Feedstock rate, pounds/hour}) \times (\text{Feedstock sulfur, ppm}) + (\text{Quenchrate, pounds/hour}) \times (\text{Quench sulfur, ppm}) + (\text{Pelletizing fluid rate, pounds/hour}) \times (\text{Pelletizing fluid sulfur, ppm})]}{(\text{Carbon black rate, pounds/hour})}$$

Thus, in order to produce the carbon blacks of the present invention:

$$\frac{[(\text{Feedstock rate, pounds/hour}) \times (\text{Feedstock ash, ppm}) + (\text{Quenchrate, pounds/hour}) \times (\text{Quench ash, ppm}) + (\text{Pelletizing fluid rate, pounds/hour}) \times (\text{Pelletizing fluid ash, ppm})]}{(\text{Carbon black rate, pounds/hour})} \leq$$

50 ppm, ash

It is well known that approximately 50% of the sulfur in the feedstock exits the carbon black process in the effluent gas. Thus the calculated sulfur level set forth above is the theoretical maximum. In general, in order to produce the carbon blacks of the present invention:

$$\frac{[(\text{Feedstock rate, pounds/hour}) \times (0.50)(\text{Feedstock sulfur, ppm}) + (\text{Quenchrate, pounds/hour}) \times (\text{Quench sulfur, ppm}) + (\text{Pelletizing fluid rate, pounds/hour}) \times (\text{Pelletizing fluid sulfur, ppm})]}{(\text{Carbon black rate, pounds/hour})} \leq$$

50 ppm, sulfur

The following testing procedures are used in evaluating the analytical and physical properties of the carbon blacks of the present invention.

The cetyl-trimethylammonium bromide absorption value (CTAB) of the carbon blacks was determined according to ASTM Test Procedure D3765-85. The DBP (dibutyl phthalate value) of the carbon blacks was determined according to the procedure set forth in ASTM D3493-86.

The ash level, sulfur level and crystallite dimensions $L_a$ and $L_c$ were determined by the following procedures.

ASH CONTENT DETERMINATION

The ash level of the carbon blacks was determined by calculating the ash percentage from a metals analysis of the carbon black. The ash level is defined as the sum of the oxides of the following elements: Al, Ba, Ca, Cr, Fe, Mg, Ni, Si, Sr, V, Zn, K and Na. The calculation of ash percentage from metals analysis assumes that the metals are present in the ash as oxides and that the thirteen elements measured are the only ones present in the ash at significant concentrations. The ash percentage is calculated by summing the levels of the oxides of the thirteen elements measured. Each oxide is calculated as follows:

$Na_2O$, ppm = (Na, ppm) × (Molecular Wt. $Na_2O$)/2×(Atomic Wt. Na)

$Al_2O_3$, ppm = (Al, ppm) × (Molecular Wt. $Al_2O_3$)/2×(Atomic Wt. Al)

$Cr_2O_3$, ppm = (Cr, ppm) × (Molecular Wt. $Cr_2O_3$)/2×(Atomic Wt. Cr)

MgO, ppm = (Mg, ppm) × (Molecular Wt. MgO)/(Atomic Wt. Mg)

SrO, ppm = (Sr, ppm) × (Molecular Wt. SrO)/(Atomic Wt. Sr)

NiO, ppm = (Ni, ppm) × (Molecular Wt. NiO)/(Atomic Wt. Ni)

BaO, ppm = (Ba, ppm) × (Molecular Wt. BaO)/(Atomic Wt. Ba)

$Fe_2O_3$, ppm = (Fe, ppm) × (Molecular Wt. $Fe_2O_3$)/2×(Atomic Wt. Fe)

CaO, ppm = (Ca, ppm) × (Molecular Wt. CaO)/(Atomic Wt. Ca)

$SiO_2$, ppm = (Si, ppm) × (Molecular Wt. $SiO_2$)/(Atomic Wt. Si)

$V_2O_5$, ppm = (V, ppm) × (Molecular Wt. $V_2O_5$,)/2×(Atomic Wt. V)

ZnO, ppm = (Zn, ppm × (Molecular Wt. ZnO)/(Atomic Wt. Zn)

$K_2O$, ppm = (K, ppm) × (Molecular Wt. $K_2O$)/2×(Atomic Wt. K).

The amount of each element, in ppm, was determined by an elemental analysis of the carbon black by Inductively Coupled Plasma (ICP) and Atomic Absorption (AAS) spectrophotometry. The analysis involves ashing, fusing and dissolving a sample of carbon black followed by the spectrophotometric analysis of the solution. The results are calculated based on the weight of the carbon black. The analysis is based on the atomic emission and atomic absorption of cations.

The following equipment and reagents were utilized:
1) Analytical balance-readable to 0.1 mg
2) Platinum crucibles and covers-50 ml capacity
3) Muffle furnace (Blue M model #E-514A, manufactured by Blue M, Blue Island, Ill.)
4) Desiccator
5) Support, steel rod with a rectangular base—approx. 18 inches tall Support ring, extension, iron—approx. 3 inches in diameter Connector for the support ring triangle, fused, silica covered—appox. 2 inches on a side Meker type, high temperature burner Tongs, crucible type, platinum tipped
6) Polypropylene volumetric flasks-100.0 ml
7) Inductively Coupled Plasma (ICP) Spectrometer manufactured by INSTRUMENTS, SA., JY-38 Sequential Scanning High Resolution Spectrometer and an H-20 external monochromator
8) Atomic Absorption (AAS) Spectrometer manufactured by PERKIN ELMER, Model 603, dual element (Na-K) hollow cathode tube source
9) Deionized water (18 megobm)
10) Fusion flux: Lithium tetraborate (Li2B407) BAKER #4503-01 Flux Grade 'BAKER ANALYZED' Reagent
11) Hydrochloric Acid (HCl)—reagent grade 36.5–38.0% BAKER #9535-03 'BAKER ANALYZED'
12) Nitric Acid—(HNO3)—concentration: 69.0–71.0%
BAKER #9601.03 'BAKER ANALYZED' Reagent
13) ICP metal standards for both the ICP and AAS calibrations The standards were of high purity, stable formulation, and easily soluble in a 5%

HNO3 solution. The standards used were from SPEX industries of N.J..

The following technique was utilized with the equipment and reagents listed above. The sample preparation was done singularly and a blank was not run.

I. Cleaned and dried Pt crucibles were prepared as follows:
1. The Pt crucibles were boiled in HCl for 15 minutes. (in a hood)
2. The Pt crucibles were then rinsed in deionized water, dried in an oven, and cooled in the desiccator. (care was taken not to contaminate the crucibles with Na from contact with the technician's hands through the use of tongs)

II. Sample weights: The weight of the crucible was recorded. Carbon black was placed into the crucibles until they were 2/3 full and the weight of the carbon black sample was determined.

III. The crucibles were placed into a cold muffle furnace and heated to 550° C. The samples were left in the muffle furnace for about 16 hours (overnight) or until the carbon black was completely ashed.

IV. The samples were cooled in the desiccator and reweighed to determine the ash weight.

V. 1.0 grams of lithium tetraborate was added to each crucible and mixed with the sample ash (or blank).

VI. The Pt crucible was covered with a Pt crucible cover, and the covered crucible was placed in the triangle supported by the ring held by the stand and heated with the burner (in a hood). The flux-ash mixture was brought to fusion temperature (850 deg C.) and then the flux mixture was held at a temperature of 1000 deg C. for about 30 minutes or until the ash is dissolved. The melt was swirled occasionally to obtain good mixing and to help the dissolution.

VII. The flux was cooled as follows: the hot crucible was swirled to coat the sides with a thin layer of flux. This action helped aid the dissolution of the flux. The crucible was immediately dipped into a container of cold water to an equivalent height of the contained fusion. The rapid cooling cracked the flux for more efficient dissolution.

VIII. Approximately 40 ml of a 5% $HNO_3$ solution was added to the cold crucible to dissolve the flux. Heating and the action of a small magnetic stirrer was also utilized as necessary to help dissolution.

IX. When the flux was dissolved, the contents of the crucible was added to a clean acid washed 100.0 ml plastic volumetric flask. (When Be was used as an internal ICP standard [10$\mu$g/ml]-than 2.0 ml of 500 $\mu$g/ml Be solution was added to the flask). The volume was brought up to the 100 ml mark with 5% $HNO_3$ solution.

The ICP was calibrated using the proper procedures for the instrument and checks are made for interferences between elements. Multi-element standards were used to simplify the analysis. Calibration and recalibration are performed by the ICP computer. Each element was divided between four standards with a concentration range as follows: (in $\mu$g/ml)

| Al | 0–50 | Mg | 0–250 | V | 0–20 |
| Ba | 0–250 | Mn | 0–20 | Zn | 0–20 |
| Ca | 0–250 | Ni | 0–20 | Zr | 0–20 |
| Cr | 0–20 | Si | 0–50 | | |
| Cu | 0–20 | Sr | 0–250 | | |
| Fe | 0–50 | Ti | 0–20 | | |

The standards were matrix matched to the samples.

The AAS was calibrated with individual standards each time a series of analyses were run. The standards were a mixture of K and Na with a 1% by weight addition of $Li_2B_4O_7$ and a 5% by volume addition of $HNO_3$.

| K—Na | | | K—Na | | |
|---|---|---|---|---|---|
| STD 1 | 0.00 | $\mu$g/ml | STD 5 | 5.0 | $\mu$g/ml |
| STD 2 | 0.50 | $\mu$g/ml | STD 6 | 10 | $\mu$g/ml |
| STD 3 | 1.0 | $\mu$g/ml | STD 7 | 25 | $\mu$g/ml |
| STD 4 | 2.5 | $\mu$g/ml | | | |

The first group of metals were run on the ICP. The computer attached to the ICP performs the calculations based on sample weights, dilutions, and volumes. The results were % element by weight of carbon black. A blank correction was unnecessary if the analysis standards are matrix matched to samples.

The Na and K analysis were done on the AAS and the results are in $\mu$g/ml. A blank correction was unnecessary if the analysis standards are matrix matched to samples.

$$\text{The calculation to } \mu\text{g/g of } CB = \frac{(AAS\ \mu\text{g/ml})(100.0\ \text{ml})}{(\text{sample wt. [gram]})}$$

The per cent ash is calculated as follows:

$$\%\ \text{ash by wt.} = \frac{(\text{weight of the ash[grams]})(100)}{(\text{weight of the } CB \text{ sample [grams]})}$$

The ICP results were reported to the nearest $\mu$g/gram. The K-Na results are reported to the nearest 0.1 $\mu$g/gram. Be was added as an internal standard to improve the precision of the analysis when using the ICP.

SULFUR CONTENT DETERMINATION

A wavelength dispersive x-ray fluorescence spectrophotometric procedure was used to measure the total sulfur content of carbon blacks. The following equipment and reagents were utilized:
1. Analytical balance-readable to 0.1 mg.
2. SPEX Mixer/Mill Model 8000—ball and pestle impact grinder
3. SPEX 13 mm Die Set ($\frac{1}{2}$ inch diameter) with two 13 mm polished steel pellets. (Model 3613)
4. CARVER Hydraulic Press—with a capacity of at least 12 tons
5. X-ray fluorescence spectrometer; RIGAKU Model 3070 with an Rh target end window x-ray tube computer controlled with data handling
6. Weighing/mixing vial-disposable polystyrene CHEMPLEX cat. no. 1133—75 mm×26 mm diam.
7. Ball pestles, 8 mm CHEMPLEX cat. no. 1208
8. Boric acid $\frac{1}{2}$ gram tablets-spectrographic grade CHEMPLEX cat. no. 750 blending, grinding, and briquetting additive
9. 1 inch square plastic boxes
$BaSO_4$-Barium Sulfate (powder) Certified Reagent FISHER SCIENTIFIC CO. cat. no. B-68
11. SpectroBlend CHEMPLEX cat. no. 660
12. Label tape—for sample labels.
13. Masking tape—1 inch wide—for sealing the vial tops.

A 0.25 gram (+/−0.0010 g) sample was weighed into a labeled mixing vial containing two ball pestles and two ½ gram boric acid tablets. A sample label was prepared for the vial that could later be transferred to the plastic box. The vial top was taped closed on the vial to prevent leakage.

The vial and contents were then mixed for 15 minutes using the SPEX mill. The ball pestle was removed and the contents of the vial were then poured into the ½ inch die and pressed at 20,000 pounds for about 20 seconds. The formed pellet was then transferred to the labeled plastic box without scratching the pellet faces.

The x-ray set up was as follows:

X-RAY SET UP

P-10 detector gas
helium atmosphere
x-ray tube at 40 KV, 65 milliamps-Rh end window tube
Element Code: S 05; Group: CB-S (RIGAKU System)
S K-alpha Ge crystal wavelength—110.700 degrees
background correction wavelength—109.700 degrees
50 second count time
10 mm sample holder—15 mm diaphragm A two standard calibration table was used to prepare a plot of corrected intensity versus weight % S. The standards consisted of carbon blacks previously analyzed by a combustion-gravimetric method and were as follows:

---
CBS1 = 0.001% S
CBS4 = 0.84% S
CBSR = reference standard (calibration alpha update)
(10.0000g BaSO4 + 1.0000g Spectroblend-mix 15 to 20 min)(make a pellet with a portion of the mix.)
---
NOTE: This reference standard was constructed with BaSO4 to avoid any volatility problems with sulfur with repeated reuse of the sample pellet.

The samples were run and their sulfur content calculated as weight % S of the carbon black by the x-ray computer. The results are reported to the nearest part per million (ppm). The standard deviation of the method is 16.4 ppm.

DETERMINATION OF CRYSTALLITE DIMENSIONS $L_a$ and $L_c$

The crystallite dimensions $L_a$ and $L_c$ of the carbon black were determined by an x-ray analysis of the carbon blacks. The three basic crystallinity parameters that may be obtained from an x-ray diffraction pattern are:
1) d-spacing: The average separation distance in angstroms between carbon layers which are roughly parallel and equidistant in a graphitic or turbostratic carbon;
2) $L_c$: The average crystallite dimension in angrstoms in the C-direction, i.e. the height of the "stack" of carbon layers;
3) $L_a$: The average crystallite dimension in angstroms in the A-direction, i.e. the average layer diameter.

The procedure for determining the x-ray diffraction pattern was as follows.

First a sample of the carbon black was dried in an oven at 125° C. for approximately one hour. Approximately one-quarter inch of the dried sample was poured into a die, containing a standard open holder for a horizontal goniometer. The carbon black in the die was then crushed with a brass rod using a circular motion. After crushing the crushed carbon black was broken up with a spatula. The crushing and breaking up of the carbon black was then repeated one time.

Approximately one half of the carbon black was then removed from the die and the remainder was pressed to 7 tons. The pressed pellet was then removed from the pellet holder.

An x-ray pattern of the pellet was obtained using a standard powder diffraction system with a copper x-ray tube run at 40 KV (kilovolts) and 35 milliamps. A step-scan control system was utilized to obtain the diffractogram between 8° and 72°, $2\theta$ angle increments of 0.05° with a 3 second count interval.

The digitized raw data was transferred to a VAX computer system for processing and determination of d-spacing, $L_a$ and $L_c$. An IRB 6 carbon black was analyzed by the same procedure for use as a control standard.

The rubber and plastic compositions in the following examples were evaluated utilizing the following test procedures.

The Melt Flow Index, ("MFI") of the compositions was determined according to the procedure set forth in ASTM D1238-89.

The volume resistivity of the compositions was determined in the following manner. The volume resistivity (VR) of a specimen is the product of its electrical resistance (R) and its cross sectional area (A) divided by its effective length (L) as shown by the following equation:

$$VR = R \times A/L.$$

The electrical resistance was determined as follows. A coupon having a length of 6 inches and a width of 1.5 inches is cut from an extruded tape. Two coupons are needed for each compound and they are cut from the tape so that the length is in the direction of extrusion. A half inch wide strip of silver paint (in this instance DAG#416 from Acheson Dispersions, Port Huron, Mich. was used) is applied to both sides of the end of the coupon. The top, bottom, and edges of the coupon are covered within the half inch dimension. After the paint has dried, the compounds' width, thickness, and the distance between the painted areas is measured using appropriate gauges. The coupons are placed across one 5 inch by 16 inch polycarbonate sheet so that the painted ends are off the polycarbonate sheet. The three coupons are arranged so that they are separated at least 0.25 inches from each other. Another polycarbonate sheet of the same dimensions is placed on top of the coupons. Both polycarbonate sheets are secured using appropriate fasteners. Brass shims, 0.25 inch by 0.5 inch in dimensions, are placed over the painted areas on the top and bottom of the exposed coupon ends. Appropriate clips are attached on the end of the wires to the brass shims. A digital multimeter, (in this case a Digitec H10-2120 from United Systems Corp., Dayton, Ohio was used) is utilized to determine the electrical resistance. The electrical resistance has units of ohms while A and L have units of square centimeters ($cm^2$) and centimeters (cm), respectively. Therefore the volume resistivity has units of ohms-cm.

The effectiveness and advantages of the present invention will be further illustrated by the following examples.

EXAMPLES 1-2

Examples of the novel furnace carbon blacks of the present invention were prepared in a reactor generally described herein, and as depicted in FIG. 1, utilizing the reactor conditions and geometry set forth in Table 3. The fuel utilized in the combustion reaction was natural gas supplied to the reactor at about ambient temperature, approximately 77° F. The liquid feedstock utilized in the examples were a commercially available hydrocarbon mixture having the properties indicated in Table 1 below:

TABLE 1

|  | Feedstock |
|---|---|
| Hydrogen/Carbon Ratio | 1.03 |
| Hydrogen (wt. %) | 8.00 |
| Carbon (wt. %) | 92.4 |
| Sulfur (ppm) | <20 |
| Ash (ppm) | 6 |
| A.P.I. Gravity 15.6/15.6° C. (60/60° F.)[ASTM D-287] | 10.4 |
| BMCI (Visc-Grav) | 85 |

The quenching fluids utilized in each example was water having the ash and sulfur levels set forth in table 2. This fluid was also utilized for pelletizing in Example 2.

TABLE 2

Ash and Sulfur Analysis of Quenching/Pelletizing Fluid

|  | Fluid |
|---|---|
| Ash (ppm) | 3 |
| Sulfur (ppm) | <0.3 |

The reactor conditions and geometry were as set forth in Table 3 below.

TABLE 3

|  | CARBON BLACKS | |
|---|---|---|
|  | Ex. 1 | Ex. 2 |
| D-1, in. | 20.5 | 20.5 |
| D-2, in. | 12.4 | 10.4 |
| D-3, in. | 36 | 45 |
| L-1, in. | 27 | 27 |
| L-2, in. | 12 | 12 |
| L-3, in. | 12 | 12 |
| F, in. | 6 | 6 |
| A, ft. | NA | 16.5 |
| Q, ft. | 90 | 90 |
| Oil Inj Pt. 32, ) Tips # × Size, in.) | 9 × 0.070 | 18 × 0.052 |
| Oil Rate 32, gph | 760 | 940 |
| Oil Press. 32, psig | 250 | 140 |
| Oil Preheat, 32, °F. | 200 | 200 |
| Total Comb. Air, kscfh | 450 | 450 |
| Tang. Comb. Air rate, 62, kscfh | NA | 125 |
| Comb. Air Preheat, °F. | 1100 | 900 |
| Natural Gas, kscfh | 16.4 | 8.2 |
| Air/Burn Gas Ratio | 9.7 | 9.7 |
| K+, gK+/100 gal oil | 0.1 | 0 |
| Q H2O rate, gph | 1215 | 1800 |
| Temp. at QW, °F. | 1470 | 1400 |
| Pell. Fluid Rate, lbs/hr | NA | 3660 |

Inj. = Injection;
Comb. = combustion;
Press. = pressure
32 = Point 32 on FIG. 1;
gph = gallons/hour;
psi = pounds/square inch;
in. = inches;
ft. = feet;
°F. = degrees Fahrenheit;
kscfh = standard cubic feet/hour, in 1000's
K+ = potassium;
gK+/100 gal oil = grams K+/100 gallons feedstock (oil)
NA = not utilized;
Tang. Comb. Air rate, 62 = Tangential air rate at point 60 in zone 18
Pell. Fluid Rate = pelletizing fluid rate;
lbs/hr = pounds per hour.

The carbon blacks produced in Example runs 1-2 were analyzed according to the procedures described herein. The properties of the two example carbon blacks, two control carbon blacks and a typical acetylene black are set forth in Table 4 below.

TABLE 4

| Carbon Black | Carbon Black Analytical Properties | | | | |
|---|---|---|---|---|---|
|  | Control 1 | Example 1 | Control 2 | Example 2 | Acetylene Black |
| CTAB (m²/g) | 130 | 130 | 35 | 35 | 60 |
| DBP (cc/100 g) | 112 | 112 | 124 | 110 | 220 |
| Ash (ppm) | 90 | <30 | 220 | <30 | <30 |
| Sulfur (ppm) | 200 | <30 | 3000 | <30 | <30 |
| $L_a$ (Å) | 21.3 | 21.5 | 22.5 | 22.4 | 33 |
| $L_c$ (Å) | 15.7 | 15.6 | 18.1 | 19.6 | 34 |

The Example runs described herein illustrate the effect of feedstock and quenching fluid ash and sulfur levels on carbon black ash and sulfur levels. The analytical properties of CTAB and DBP were the same for the Example 1 and the Control 1 carbon blacks. However, the total ash level of the Control 1 carbon black is 90 ppm and the total sulfur level of the Control 1 carbon black is 200 ppm. In contrast, the Example 1 carbon black, a carbon black of the present invention, had a total ash level of <30 ppm and a total sulfur level of <30 ppm.

Similarly, the resulting analytical properties of CTAB and DBP of the Example 2 and Control 2 carbon blacks were similar. However, the total ash and sulfur levels of the Example 2 carbon black, a carbon black of the present invention, were much lower than the total ash and sulfur levels of the Control 2 carbon black.

The acetylene black is provided in Table 4 for comparison purposes. As shown in Table 4, the Example 1 carbon black and the Example 2 carbon black, carbon blacks of the present invention, have ash and sulfur levels comparable to the acetylene black.

EXAMPLE 3

Ethylene ethyl acrylate (EEA) compositions containing the carbon blacks of Example 1 and Control 1 were prepared and evaluated. The EEA utilized has an MFI (melt flow index) of 6 g/10 min. and a density of 0.931 g/cm³. The compositions consisted of carbon black and EEA only.

Two EEA compositions, A and B, each containing 38%, by weight, carbon black were prepared using the carbon blacks of Example 1 and Control 1 as shown in Table 5 below:

TABLE 5

| EEA Composition | Carbon Black | Wt. % Carbon Black |
|---|---|---|
| A | Control 1 | 38 |
| B | Example 1 | 38 |

The EEA compositions were prepared utilizing a Werner-Pfleiderer twin screw mixer.

The volume resistivity and MFI of each of the EEA Compositions, A and B, was evaluated according to the procedures described herein. The results are set forth in Table 6:

TABLE 6

| EEA Composition | Volume Resistivity @ 20° C. | MFI |
| --- | --- | --- |
| A | 97 ohm cm | 39.6 g/10 min. |
| B | 64 ohm cm | 40.9 g/10 min. |

These results show that EEA compositions utilizing the carbon blacks of the present invention having ash and sulfur levels less than or equal to 50 ppm (EEA Composition B) have volume resistivity and MFI values substantially equivalent to the EEA composition produced with the control carbon black.

EXAMPLE 4

Ethylene ethyl acrylate (EEA) compositions containing the carbon blacks of Example 2 and Control 2 were prepared and evaluated. For further comparison purposes, an EEA composition containing an acetylene black having the analytical properties listed in Table 4 above, was also prepared. The EEA utilized has an MFI (melt flow index) of 6 g/10 min. and a density of 0.931 g/cm$^3$.

The compositions consisted of carbon black and EEA only, each containing 40%, by weight, and were prepared utilizing a Banbury mixer. The components of the three EEA compositions are shown in Table 7 below:

TABLE 7

| EEA Composition | Carbon Black | Wt. % Carbon Black |
| --- | --- | --- |
| C | Control 2 | 40 |
| D | Example 2 | 40 |
| E | Acetylene Black | 40 |

The volume resistivity and MFI of each of the EEA Compositions, C, D and E, was evaluated according to the procedures described herein. The results are set forth in Table 6:

TABLE 6

| EEA Composition | Volume Resistivity @ 20° C. | MFI |
| --- | --- | --- |
| C | 20 ohm cm | 43.6 g/10 min. |
| D | 27 ohm cm | 43.0 g/10 min. |
| E | 35 ohm cm | 4.1 g/10 min. |

These results show that EEA compositions utilizing the carbon black of the present invention having ash and sulfur levels less than or equal to 50 ppm (EEA Composition D) have volume resistivity and MFI values substantially equivalent to the EEA Composition produced with the Control carbon black.

Moreover, these results also show that EEA compositions incorporating the carbon blacks of the present invention, (EEA Composition D) has a substantially equivalent volume resistivity value, but a lower MFI value in comparison with EEA compositions incorporating a typical acetylene black (EEA Composition E). The higher MFI value imparted by the carbon black of the present invention (EEA Composition D) indicates a higher rate of flow which indicates a lower viscosity and in turn indicates that the composition is advantageous for extrusion processing.

As a result of the carbon blacks of the present invention having ash and sulfur levels less than or equal to 50 ppm, it is expected that the carbon blacks of the present invention will minimize the initiation of water trees in compositions intended for use as semi-conductive shielding compounds for electric power cables. Therefore, power cables using wire shielding compositions incorporating the carbon blacks of the present invention would be expected to have longer service lives than power cables using wire shielding compositions incorporating heretofore known non-acetylene carbon blacks.

It should be clearly understood that the forms of the present invention herein described are illustrative only and are not intended to limit the scope of the invention.

We claim:

1. A furnace carbon black having an ash level less than or equal to 50 ppm; a sulfur level less than or equal to 50 ppm, a $L_a$ less than or equal to 30 Å and a $L_c$ less than or equal to 30 Å.

2. The carbon black of claim 1 wherein the ash level is less than or equal to 30 ppm and the sulfur level is less than or equal to 30 ppm.

3. The carbon black of claim 1 wherein the ash level is less than or equal to 10 ppm and the sulfur level is less than or equal to 10 ppm.

4. The carbon Mack of claim 1 further characterized by having a CTAB of 30–135 m$^2$/g and a DBP of 105–170 cc/100 g.

5. The carbon black of claim 2 further characterized by having a CTAB of 30–135 m$^2$/g and a DBP of 105–170 cc/100 g.

6. The carbon black of claim 4 wherein the CTAB is 120–135 m$^2$/g and the DBP is 105–130 cc/100 g.

7. The carbon black of claim 5 wherein the CTAB is 120–135 m$^2$/g and the DBP is 105–130 cc/100 g.

8. The carbon black of claim 4 wherein the CTAB is 30–45 m$^2$/g and the DBP is 105–130 cc/100 g.

9. The carbon black of claim 5 wherein the CTAB is 30–45 m$^2$/g and the DBP is 105–130 cc/100 g.

10. The carbon black of claim 4 wherein the CTAB is 130 m$^2$/g, the DBP is 112 cc/100 g, the $L_a$ is 21.5 Å, the $L_c$ is 15.6 Å, the ash level is less than 30 ppm and the sulfur level is less than 30 ppm.

11. The carbon black of claim 4 wherein the CTAB is 35 m$^2$/g, the DBP is 110 cc/100 g, the $L_a$ is 22.4 Å, the $L_c$ is 19.6 Å, the ash level is less than 30 ppm and the sulfur level is less than 30 ppm.

12. A composition of matter comprising: a material selected from the group consisting of rubbers, plastics, and mixtures thereof; and a furnace carbon black having an ash level less than or equal to 50 ppm, a sulfur level less than or equal to 50 ppm and a $L_a$ less than or equal to 30 Å and a $L_c$ less than or equal to 30 Å, said composition having a melt flow index higher than that of a comparable composition incorporating a carbon black with an $L_a$ greater than 30 Å and a $L_c$ greater than 30 Å and having longer service life than a comparable composition incorporating a furnace carbon black with ash and sulfur levels greater than 50 ppm.

13. The composition of claim 12 wherein the carbon black has an ash level less than or equal to 30 ppm and a sulfur level less than or equal to 30 ppm.

14. The composition of claim 13 wherein the carbon black has an ash level less than or equal to 10 ppm and a sulfur level less than or equal to 10 ppm.

15. The composition of claim 12 wherein the carbon black has a CTAB of 30–135 m$^2$/g and a DBP of 105–170 cc/100 g.

16. The composition of claim 12 wherein the carbon black has a CTAB of 120–135 m²/g and a DBP of 105–130 cc/100 g.

17. The composition of claim 12 wherein the carbon black has a CTAB of 30–45 m²/g and a DBP of 105–130 cc/100 g.

18. The composition of claim 12 wherein the carbon black is present in an amount between 5 and 300 phr.

19. The composition of claim 12 wherein the carbon black is present in an amount between 40 and 90 phr.

* * * * *